United States Patent Office 2,707,197
Patented Apr. 26, 1955

2,707,197

PROCESS FOR THE SEPARATION OR PURIFICATION OF ORGANIC MIXTURES OR PRODUCTS

Georges Jules Pierre Souillard, Forest-Brussels, Belgium, assignor to Institut Francais du Petrole des Carburants et Lubrifiants, Paris, France No Drawing. Application July 19, 1951,
Serial No. 237,674

Claims priority, application France July 22, 1950

1 Claim. (Cl. 260—674)

It is well known that chlorination is an easy and cheap technique, having the extra advantage of being sensitive to various forms of activation.

It is recalled that the different activating agents capable of being effectively utilized in chlorination are thermal catalytic, photochemical, or electrical in nature.

It is recalled also that the separation of components of certain organic mixture by a physical process, that is distillation, selective absorption, etc., proves difficult if not impossible.

It is known in particular that the activating agent produces the following results in the chlorination of various families of organic compounds.

Paraffins and naphthenes may be chlorinated photochemically at normal temperature with good quantic yields.

Thus I have established that the quantic yield for paraffins was about $10^5$, for naphthenes about 20,000 to $10^5$ and still more according to luminous intensity, whereas for aromatics this yield, smaller, was for instance, 640 for benzene, 2000 for toluene and for chlorinated derivatives, 8500 for monochlorocyclohexane, 1250 for benzyl chloride, and 50 for benzylidene chloride.

To give an example, and to give a concrete idea of this notion of quantic yield, 1 kwh., of light, effectively absorbed with an appropriate wave length (3,500 angstroms) would permit, for an 80 molecular weight hydrocarbon, giving a quantic yield of 100,000, the synthesis of 80 metric tons of chlorinated product.

The chlorine reaction results in the substitution of a hydrogen atom by a chlorine atom. On the other hand the olefins, as a result of their double bond, are very easily chlorinated without even the intervention of an activating agent. The chlorination is spontaneous. Heterocyclics are sensitive to thermal chlorination even at room temperature.

With aromatics the chlorine can be bonded to the benzene in the two following ways: it is added if the operation is carried out photochemically, while it substitutes a hydrogen atom, if the operation is carried out catalytically, the catalyst most frequently employed being iron, iodine and the iron-iodine pair.

As for aromatics with a side chain, if we operate catalytically, the chlorine is bonded in the ring; if we proceed photochemically, the fixation takes place in the chain.

The invention utilizes these various observations to effect the separation of the components of mixtures of organic compounds or the purification of organic products, and more particularly of these mixtures or products which lend themselves with difficulty to a purely physical technique of fractionation or purification.

In principle, the process according to the invention is characterized by the combination of the following successive main operations.

(1) The mixture to be separated into its components or the product to be purified is analyzed and, in this way, the percentage of the mixture or the product to be submitted to chlorination is determined.

(2) The mixture or the product is submitted to chlorination, either without the intervention of an activating agent, or with an activating agent of such a nature that the chlorinatiton affects only the secondary substance or substances to be eliminated, this activated chlorination being effected during the time necessary to obtain the complete elimination of these secondary substances.

(3) After chlorination, a physical separation of the chlorinated and non chlorinated products is effected. This separation is easy since the properties of these two groups of products have become sufficiently different.

In the presence of a mixture of two hydrocarbons belonging to different classes and not liable to be separated by one of the classical physical methods, the invention permits, with a suitable choice of the activating agent, to chlorinate one of the products independently of the other. The introduction of chlorine into the molecule of this product will moreover be able to increase its value but certainly its physical properties will be sufficiently modified for an easy separation of the two hydrocarbons constituting the mixture to be carried out.

Following are several examples of application of the invention to the fractionation or purification of hydrocarbons.

In the case of a paraffin or a naphthene mixed with an olefin, if an activating agent does not intervene, only the olefin will be attacked by the chlorine. In practice, it will suffice to work at room temperature.

In the case of an aromatic mixed either with a naphthene or a paraffin, if the chlorination is carried out with a photochemical activating agent, only the naphthene (or the paraffin) will be chlorinated for the quantic yields of naphthenes (or of paraffins) are substantially superior to those of aromatics. However, chlorination with a catalytic activating agent affects only the aromatic compounds, by substitution.

In the case of an aromatic mixed with an olefin, if one chlorinates thermally, only the olefin will be attacked at room temperature and will fix chlorine by addition.

If mixtures which are more particularly, but not exclusively, alluded to by the invention are envisaged, that is to say those which cannot be easily separated by a physical technique, the following table summarizes the characteristics of means of purification applied by the invention.

TABLE I

| Nature of the mixture | Technique used | Pure product obtained |
|---|---|---|
| (1) a paraffin, a naphthene or an aromatic+a certain proportion of an olefin. | thermal chlorination (spontaneous). | the paraffin, the naphthene, or the aromatic. |
| (2) an aromatic+a certain proportion of a paraffin or of a naphthene or a certain proportion of a paraffin-naphthene mixture. | photochemical chlorination. | the aromatic. |
| (3) a paraffin or a naphthene+a certain percentage of an aromatic. | catalytic chlorination. | the paraffin or the naphthene. |

We may, by applying the invention, purify mixtures still more complex; for instance, from a mixture containing mainly a paraffin (or a naphthene), with a certain percentage of an olefin or of an aromatic, may be derived the pure paraffin (or naphthene) provided that the chlorination is first thermal to attack the aromatic.

In application of this very general technique, we will now present several examples more particularly studied by the inventor.

(1) Removal of thiophene from benzene.
(2) Preparation of pure grade cyclohexane from a cyclohexane-benzene mixture.
(3) Preparation of pure grade benzene from a benzene cyclohexane mixture.

*(1) Removal of thiophene from benzene*

This process can hardly be effected by a physical method. In fact benzene and thiophene give an ideal mixture. Moreover boiling points are close. At present the removal of thiophene is obtained industrially by a difficult and costly process, that is by submitting the impure benzene to several washings in sulfuric acid at 98°, in water, in caustic soda, again in water, then to drying and distillation.

It is easier and much more economical to proceed by chlorination. By its reactivity as regards chlorine, the thiophene may be assimilated to an olefin; the purification method, therefore comes under class I of Table I above: we thus apply thermal chlorination which does not attack the benzene (aromatic) in the liquid phase.

Different tests have been made starting from a benzene containing 0.5% of thiophene which represents approximately the usual percentage of thiophene present in technical grade benzene; chlorination was performed at room temperature in a light-proof vessel in the absence of any catalyst, using a quantity of chlorine a little in excess of the theoretical quantity for fixing one chlorine atom on thiophene. The chlorination terminated, the product is washed in caustic soda, then in water. Pure benzene is then obtained by distillation but other physical methods might be used. The chlorinated thiophene accumulates in distillation bottoms. The process' efficiency is determined by the isatine test. While the initial mixture gives a dark blue colour in the presence of sulphuric isatine solution, the benzene purified according to the invention remains colorless under these conditions.

(2) *Preparation of pure grade cyclohexane from a cyclohexane-benzene mixture*

Cyclohexane prepared by catalytic hydrogenation (Raney nickel for instance) is not easily obtained in a pure state, since the last portitons of benzene can only be hydrogenated with great difficulty. In order to get an approximately total transformation, it would be necessary to perform the hydrogenation during a very long time. On the other hand benzene and cyclohexane have very close boiling points and form ideal mixture; so, one cannot hope to separate the last traces of benzene by any physical method. Thus it is more advantageous to continue hydrogenation to the point where it begins to become difficult, then to treat mixture following technique III of Table I, that is by chlorinating the benzene catalytically.

It is first necessary to know the proportion of benzene in the cyclohexane to be chlorinated; we may take the density, the refractive index or the melting point. Reference is then made to curves of density of refractive index or of melting point for benzene-cyclohexane mixtures.

Knowing the quantity of benzene in the mixture, the quantity of chlorine necessary to transform all the benzene into a chlorinated product may be evaluated. It must be remembered that before all the benzene is transformed into monochlorobenzene, the latter begins to change into dichlorobenzene; according to the work of MacMullin (Chemical Engineering Progress 44 (3) 183–88, March 48) which gives the distribution curve of the products of the chlorination of benzene, during a catalytic chlorination approximately 1.5 mol, of $Cl_2$ against 1 mol. of $C_6H_6$ is necessary so that all the benzene is transformed into chlorinated products; in practice, it is good to feed 2 mol. of $Cl_2$ against 1 mol. of $C_6H_6$.

In tests made by the inventor, iron was chosen as catalyst but other catalysts could as well serve. A closed, light-proof, refrigerated vessel is used, permitting operation at 18–20° C. The quantity of chlorine admitted is measured with a flow-meter.

The reaction takes place in three phases:
(a) An induction period lasting about 30 minutes.
(b) A reaction period with abundant release of HCl (efficient phase).
(c) The product to be chlorinated reacts with even greater difficulty with the chlorine; simultaneously with the release of HCl there is a release of chlorine which indicates the end of the operation.

The chlorination terminated, the product is washed in water, in caustic soda, then again in water. Thus the iron chloride and the hydrochloric acid are removed in solution. It is then easy to separate the cyclohexane by a physical method.

The results obtained for the tests made are presented in the following Table II. In this table, the first column indicates the number of the test, the second the refractive index of the mixture, the third the specific gravity of the mixture, the fourth the per cent of benzene in the mixture, the fifth the refractive index of cyclohexane after purification, the last the molecular chlorine-benzene ratio used for the test.

TABLE II

| Test No. | Refractive index, $n_{23°}$ C. | Specific gravity, $d_{23°}$ C. | Percent benzene | Refractive index of purified cyclohexane, $n_{23°}$ C. | Molecular ratio, chlorine/benzene |
|---|---|---|---|---|---|
| 1 | 1.4290 | 0.7778 | 5 | 1.4252 | 2/1 |
| 2 | 1.4290 | 0.7775 | 5 | 1.4250 | 2/1 |
| 3 | 1.4363 | 0.7903 | 16 | 1.4253 | 2/1 |
| 4 | 1.4279 | 0.7773 | 4 | 1.4253 | 1.5–2/1 |
| 5 | 1.4272 | 0.7769 | 3.5 | 1.4248 | 4/1 |

These results show that a cyclohexane more than 99% pure (at 23° C. the index of pure cyclohexane is 1.4237, and a cyclohexane index of 1.4247 was able to be obtained) is easily obtained.

A test on a sample containing 5% benzene gave 94.5% cyclohexane after chlorination, that is only a loss of about 0.5% on the product to be purified. This shows all the advantage of the inventions' process in this purification.

(3) *Procurement of pure benzene from a benzene-cyclohexane mixture*

When benzene is prepared by dehydrogenation of cyclohexane, for the same reasons as those indicated under (2), there sometimes remains some percentage of cyclohexane after dehydrogenation. The problem now posed is to remove some percentage of cyclohexane from a benzene-cyclohexane mixture, which corresponds to case II of Table I. We will proceed therefore by photochemical chlorination.

On the mixture containing 95% benzene and 5% cyclohexane photochemical chlorination is effected at room temperature; an excess of chlorine is admitted; after a caustic soda and water bath to eliminate hydrochloric acid, pure benzene is obtained. The pure benzene which served in the mixture had an index of 1.504 at 18° C.; after purification to free it from cyclohexane, the separated benzene had exactly the same index of 1.504 at 18° C.

I claim:
Method of separating a mixture consisting essentially of benzene and cyclohexane wherein the cyclohexane is present in minor proportion, comprising analyzing the mixture to determine quantitatively the quantity of cyclohexane present in the mixture and then passing chlorine into the mixture in the presence of light and in the absence of catalysts at ambient temperature in molar excess to the cyclohexane to preferentially chlorinate the cyclohexane, and then physically separating the chlorinated cyclohexane from the benzene.

References Cited in the file of this patent

UNITED STATES PATENTS

| | | |
|---|---|---|
| 1,087,961 | Masland | Feb. 14, 1914 |
| 1,674,472 | Jaeger | June 19, 1928 |
| 1,741,305 | Jaeger | Dec. 31, 1929 |
| 2,181,642 | McMillan | Nov. 28, 1939 |
| 2,328,275 | Heard | Aug. 31, 1943 |
| 2,585,091 | Clarke | Feb. 12, 1952 |
| 2,613,214 | Pines | Oct. 7, 1952 |

FOREIGN PATENTS

| | | |
|---|---|---|
| 626,705 | Great Britain | July 20, 1949 |